May 24, 1932.   C. H. MYERS   1,859,746
COMBINATION TRUNK AND LUGGAGE CARRIER
Filed Dec. 5, 1928
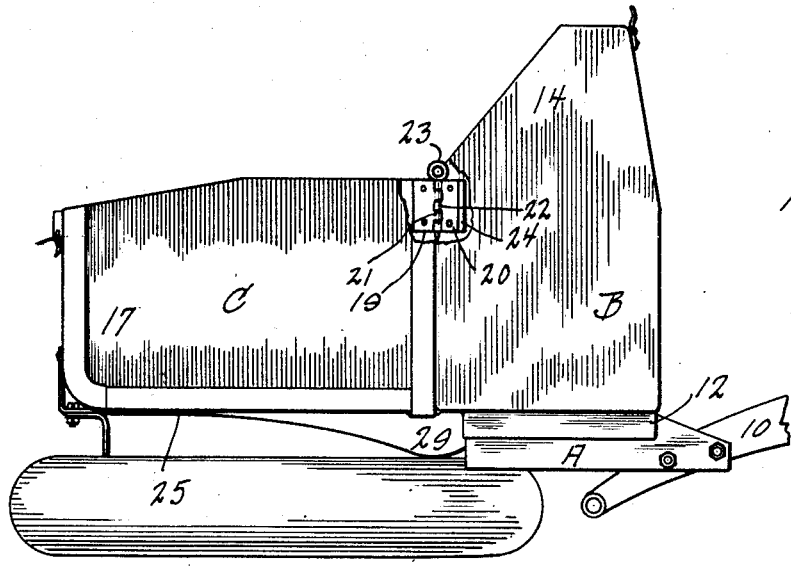
Fig. 1
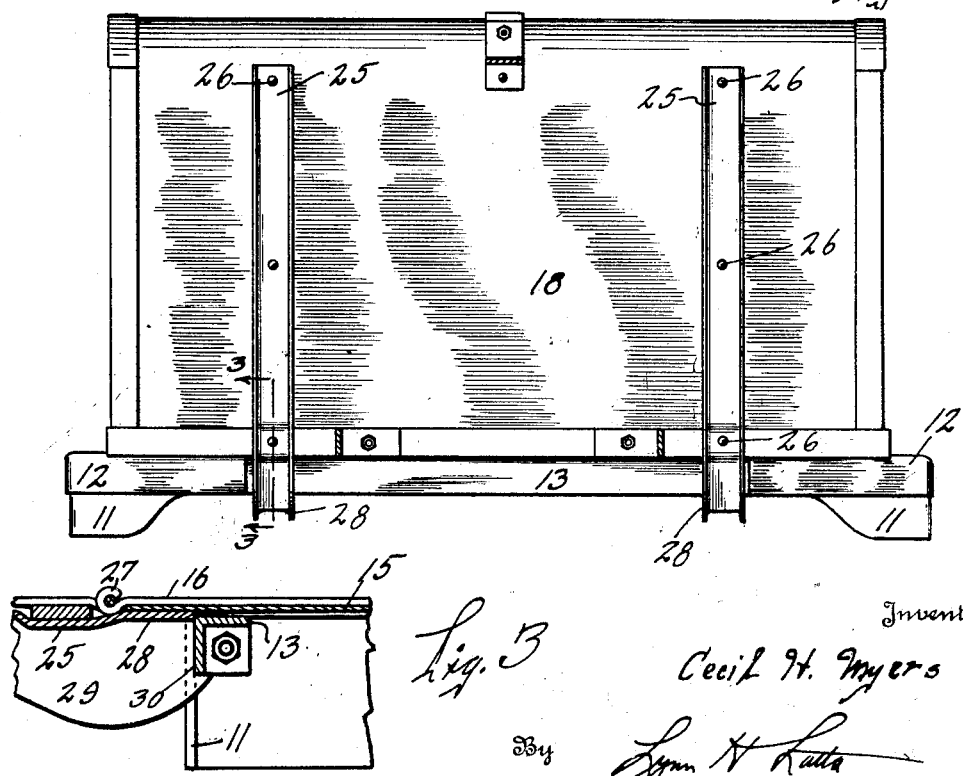
Fig. 2
Fig. 3
Inventor
Cecil H. Myers
By Lynn H. Latta
Attorney Patented May 24, 1932

1,859,746

UNITED STATES PATENT OFFICE

CECIL H. MYERS, OF SIOUX CITY, IOWA, ASSIGNOR TO THE GABRIEL KARI-KEEN COMPANY, OF SIOUX CITY, IOWA, A CORPORATION OF DELAWARE

COMBINATION TRUNK AND LUGGAGE CARRIER

Application filed December 5, 1928. Serial No. 323,938.

My invention relates to luggage carriers of the type adapted to be attached to the rear of an automotive vehicle.

An object of my invention is to provide an improved luggage carrier construction including a platform or supporting member adapted to be attached between the chassis members of a vehicle and a receptacle or luggage carrier supported by said supporting member.

More particularly it is my purpose to provide in an arrangement of this character a luggage carrier section which is supported by said supporting member in hinged relation thereto and provided with rigidly associated means projecting beyond its hinge and adapted to engage a member forming part of or attached to said supporting member whereby to support the movable luggage carrier section in a substantially horizontal position, the luggage carrier section being of box-like formation and provided with side walls adapted to project upwardly to form a luggage carrier or receptacle when in said substantially horizontal position.

Another object is to provide a luggage carrier having the features mentioned in the last paragraph and having in addition means for preventing rebound of the movable luggage carrier when the vehicle carrying it is in motion.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a side elevation of a trunk constructed according to my invention, the trunk being shown in open position serving as a luggage carrier and parts being broken away to better illustrate the construction.

Fig. 2 is a rear elevation of the trunk in closed position, the tire carrier being shown in section.

Fig. 3 is a detail, sectional view, taken as indicated by the line 3—3 of Fig. 2, parts being shown in the position they assume when the trunk is open.

I will briefly describe the old features of construction embodied in the present structure.

The rear portion of a vehicle chassis is indicated in Fig. 1 by the reference character 10.

The platform or supporting member is indicated generally by the reference character A. A supporting member includes L shaped corner brackets 11 and caps 12 and a rear cross bar 13 which serves to connect the L shaped brackets 11 to form a rigid supporting structure to extend between the chassis members 10 of the vehicle.

I provide a stationary trunk member which is indicated generally by the reference character B and which has side walls 14, a bottom wall 15 (see Fig. 3) and hinge strips 16, secured to the bottom wall 15 in any suitable manner as by spot welding.

The movable trunk member or luggage carrier section is indicated generally by the reference character C and comprises side walls 17 and a wall 18 adapted to form the bottom of the luggage carrier when the luggage carrier section is in a horizontal position as shown in Fig. 1. When the luggage carrier section is in a raised position as shown in Fig. 2, the wall 18 forms a rear wall of a closed trunk comprising the two sections B and C, the section B being open at its rear as is customary in luggage carriers of this character.

The locking device for helping to carry the load and for preventing rebound comprises a pair of plates 19 and 20, secured to the walls 17 and 14, respectively, on the inner sides thereof and provided with coacting loops 21 and 22, respectively, adapted to register and to receive a pin 23, which locks them together. The pin 23 is normally carried in a sleeve 24, which is formed as part of the plate 20.

Means is provided for assisting the locking device at times in supporting the movable trunk member in horizontal position, and at other times to serve independently in so doing. This means also acts to support the movable trunk member and its load while the pin 23 is being inserted into the loops 21 and 22.

This function in the present invention is accomplished by means of extensions secured to or forming part of the movable trunk member and adapted to engage the bottom of the trunk. These extensions are shown in the drawings as channel bars 25, secured as at 26 to the rear wall 18 and projecting beyond the hinge 27, which connects the movable and stationary trunk members C and B, respectively, as at 28.

Since the biggest strain on the extensions comes near the hinge, the side flanges thereof are increased in depth toward the hinge from either end of the channel bars, as at 29.

In order to obtain increased bracing effect, the ends of the flanges 29 may be cut as at 30 to fit snugly against the crossbar 13.

It will be understood that although channel bars have been illustrated and described, the extensions 28 may be formed in other ways. The two requisites of these extensions are that they project materially beyond the hinge and that they have sufficient strength. This strength might be obtained by widening the extensions.

It will be understood that the extensions 28 are of sufficient strength to support the movable luggage carrier section together with a load since the locking devices may or may not be used at the option of the person operating the trunk. When the locking devices are employed, they serve partly in helping to sustain the load and partly to prevent rebound of the movable luggage carrier section upwardly while passing over rough or uneven roads.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In a combination trunk and luggage carrier, a fixed trunk member, having a bottom wall and having an opening at the rear, a platform upon which said fixed trunk member is supported, said platform including a horizontal crossbar, a movable trunk member hinged to the fixed trunk member near the rear extremity of the bottom wall, said cross bar having a vertical face spaced inwardly from the rear extremity of said bottom wall, and means projecting from the movable trunk member, extending beyond the hinge, and adapted to engage beneath said bottom wall and against the vertical face of said crossbar when the movable trunk member is in a position removed downwardly from its normal position, to limit downward movement of the trunk member.

2. In a combination trunk and luggage carrier, a fixed trunk member having a bottom wall and open at the rear, a platform upon which said fixed trunk member is supported, said platform including a horizontal crossbar, a movable trunk member hinged to the fixed trunk member near the rear extremity of the bottom wall, and means projecting from the movable trunk member, extending beyond the hinge and adapted to engage the bottom wall and said crossbar, on at least two faces thereof when the movable trunk member is in a position removed downwardly from its normal position, to limit downward movement of said movable trunk member.

Signed this 22 day of November, 1928, in the county of Woodbury and State of Iowa.

CECIL H. MYERS.